(12) United States Patent
BenHanokh et al.

(10) Patent No.: US 12,164,797 B2
(45) Date of Patent: Dec. 10, 2024

(54) REPLICATING STORAGE DATA AND METADATA IN SEPARATE STORAGE LAYERS OF A DISTRIBUTED STORAGE SYSTEM

(71) Applicant: Red Hat, Inc., Raleigh, NC (US)

(72) Inventors: Gabriel Zvi BenHanokh, Ra'anana (IL); Or Friedmann, Ra'anana (IL); Yehoshua Salomon, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 64 days.

(21) Appl. No.: 18/069,725

(22) Filed: Dec. 21, 2022

(65) Prior Publication Data

US 2024/0211163 A1  Jun. 27, 2024

(51) Int. Cl.
*G06F 3/06* (2006.01)

(52) U.S. Cl.
CPC ............ *G06F 3/065* (2013.01); *G06F 3/0604* (2013.01); *G06F 3/0659* (2013.01); *G06F 3/067* (2013.01)

(58) Field of Classification Search
CPC ...... G06F 3/065; G06F 3/0604; G06F 3/0659; G06F 3/067
See application file for complete search history.

(56) References Cited

U.S. PATENT DOCUMENTS

| | | | |
|---|---|---|---|
| 9,268,797 B2 | 2/2016 | Whitehead et al. | |
| 9,639,555 B1* | 5/2017 | Faibish | G06F 16/183 |
| 10,628,443 B2 | 4/2020 | Cantwell et al. | |
| 11,068,502 B1 | 7/2021 | Potnis et al. | |
| 11,360,689 B1 | 6/2022 | Grunwald et al. | |
| 2010/0333116 A1 | 12/2010 | Prahlad et al. | |
| 2018/0052744 A1* | 2/2018 | Chen | H04L 67/561 |
| 2021/0294777 A1* | 9/2021 | Maybee | G06F 16/185 |
| 2022/0019367 A1 | 1/2022 | Freilich et al. | |

FOREIGN PATENT DOCUMENTS

CN  111427666 B  4/2022

* cited by examiner

*Primary Examiner* — Eric Cardwell

(74) *Attorney, Agent, or Firm* — Kilpatrick Townsend & Stockton LLP

(57) ABSTRACT

Storage data and metadata in separate storage layers of a distributed storage system can be replicated via separate channels. For example, a first gateway at a first storage layer in a first data center can identify a data object for replication to a second data center. The first gateway can access metadata to determine that the data object corresponds to a set of storage data on a first storage node in the first data center. The first gateway can then transmit the metadata to a second gateway in the second data center via a first network. The first gateway can also transmit a command to the first storage node for causing the first storage node to transmit the set of storage data to a second storage node in the second data center via a second network.

20 Claims, 3 Drawing Sheets

REPLICATING STORAGE DATA AND METADATA IN SEPARATE STORAGE LAYERS OF A DISTRIBUTED STORAGE SYSTEM

TECHNICAL FIELD

The present disclosure relates generally to data replication in distributed storage systems. More specifically, but not by way of limitation, this disclosure relates to replicating storage data and metadata in separate storage layers of a distributed storage system.

BACKGROUND

Cloud computing systems provide on-demand access to a shared pool of computing resources, such as computing power and data storage. Some cloud computing systems include distributed storage systems for synchronizing, coordinating, and storing data. Such distributed storage systems include storage nodes that can work together so that the distributed storage system behaves as one storage system. Distributed storage systems can provide improvements to scalability, redundancy, and performance. For example, distributed storage systems can be easily scaled horizontally to include more or fewer storage nodes depending on demand. Distributed storage systems can also store multiple copies ("replicas") of the same data for high availability, backup, and disaster recovery purposes.

Storage replication technology enables replication of data volumes between servers or storage clusters in distributed storage systems to provide redundancies in the event of failure at one storage site. Replication techniques can vary depending upon how data is stored and the purpose for replication. Data replication can be a full volume replication ("cloning"), or a pointer based virtual replication ("snapshot"). Timing of data replication can be asynchronous or synchronous. For synchronous replication, no following write happens until the current write from the source server to a remote target server is completed and acknowledged. For asynchronous replication, as soon as the "write" happens, the source server can send an acknowledgement message, and following writes can happen.

DETAILED DESCRIPTION

Figure 1:
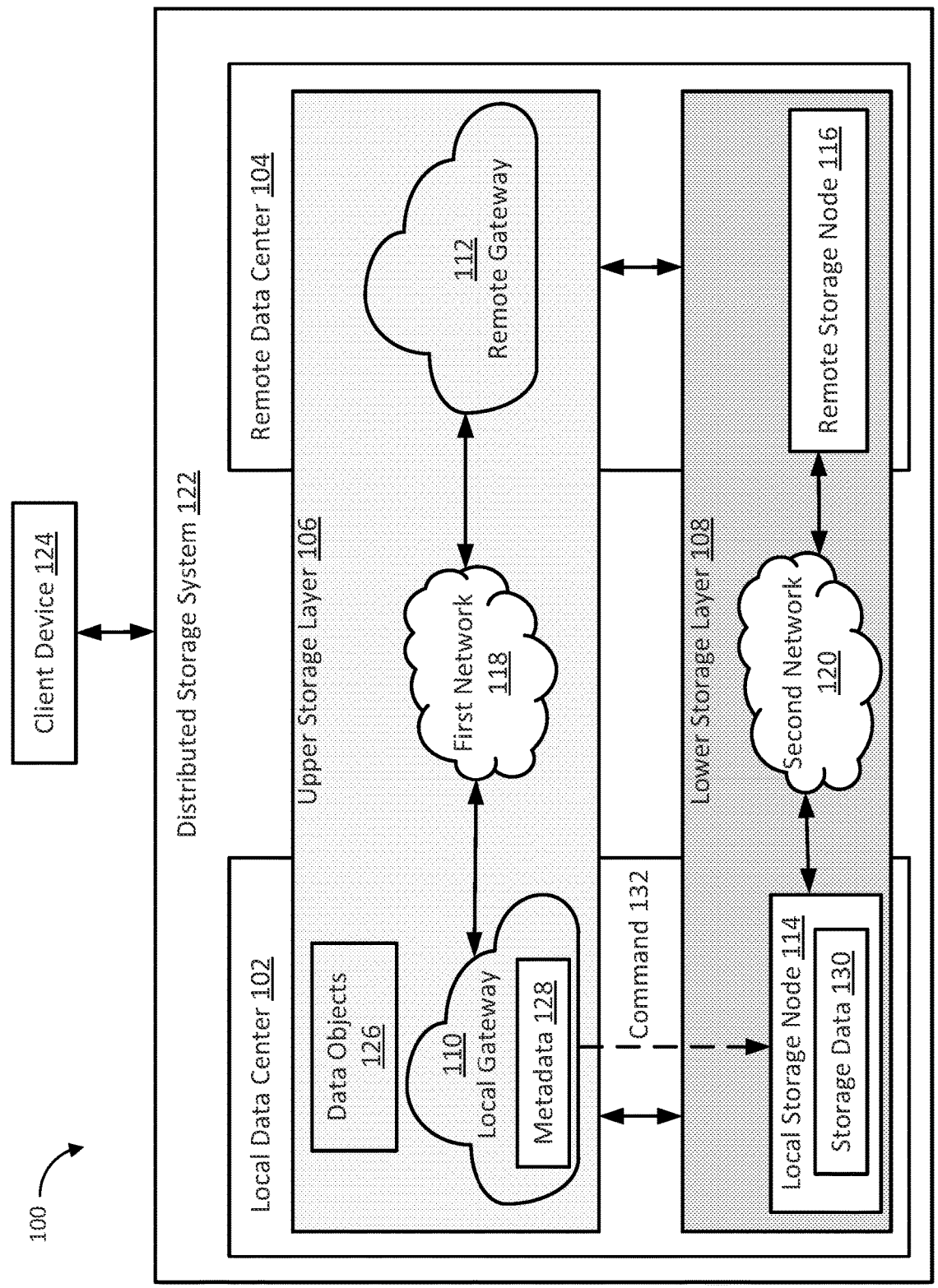
FIG. 1 is a block diagram of an example of a system for replicating storage data and metadata in separate storage layers of a distributed storage system according to some aspects.

Many legacy storage systems are not well equipped for rapidly developing cloud applications. For example, newer cloud applications may use data formats like objects that are incompatible with legacy storage systems. To help overcome this discrepancy, a new storage architecture can be implemented on top of an existing storage array, where the new storage architecture is an upper storage layer acting as a gateway to the underlying storage. For example, object storage daemons for the Ceph storage platform (Ceph-OSD) can be implemented on top of an existing block storage system or file storage system. The upper storage layer can allow clients to make use of the underlying legacy storage system by translating requests to read and write objects into requests that are compatible with the underlying legacy storage system. In some cases, distributed storage systems that have this dual storage-layer architecture may support replication between remote data centers to enable redundancies in the event of failure at the primary data storage site. Both the underlying storage layer and the upper storage layer may require protection from failure to allow continuous access. This replication process typically involves a local gateway in the upper storage layer retrieving the storage data from the legacy storage system at a local data center and transmitting the storage data to a peer gateway in the upper storage layer at a remote data center. The storage data is usually transmitted to the peer gateway over a client network, like the general-purpose Internet. The peer gateway then writes the storage data to an underlying storage node of the legacy storage system at the remote data center. But this is generally a slow process, because it requires the local gateway at the local storage site to obtain the storage data from the underlying legacy storage system and transmit the storage data over the client network to the remote data center, both of which introduce latency. In addition, the client network may be slow and unreliable.

Some examples of the present disclosure can overcome one or more of the abovementioned problems by splitting a replication process for replicating data between two data centers into two coordinated parts. In a first part of the replication process, an upper storage layer in a local data center transmits metadata about the storage data (i.e., the data to be replicated), but not the storage data itself, to a remote data center. In the second part of the replication process, a lower storage layer in the local data center transmits the actual storage data to the remote data center. The upper storage layer can transmit the metadata to the remote data center via a first network, such as the client network. The lower storage layer can transmit the metadata to the remote data center via a second, faster network. For example, the lower storage layer can leverage internal array networks for replicating storage data, such as a Storage Area Network (SAN), a Fiber Channel (FC), or a dedicated Internet Protocol (IP) network. The internal array networks can replicate storage data much faster and more reliable than the client network. By replicating the storage data via the internal array networks in the lower storage layer, the burden on the client network can be significantly alleviated, and the latency can be much reduced, thus providing a faster and more reliable replication process.

In some examples, the local gateway in the upper storage layer receives an acknowledgement message from the local storage node or the remote storage node in the lower storage layer when the underlying storage data is fully replicated. The local gateway can also receive an acknowledgement message from the remote gateway when the metadata related to the underlying storage data is fully replicated. The local gateway may then send an acknowledgement message, for example to a client device indicating a completion of the replication process associated with the underlying storage data and related metadata.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for replicating storage data 130 and metadata 128 in separate storage layers of a distributed storage system 122 according to some aspects. The system 100 includes a client device 124 and a distributed storage system 122. The client device 124 can be in communication with the distributed storage system 122 via a network, such as a local area network or the Internet. Examples of the client device 124 can include a laptop computer, desktop computer, mobile phone, or tablet. In some examples, the distributed storage system 122 can include Ceph, which is an open-source software-defined storage platform that implements object storage on a distributed computer cluster.

The distributed storage system 122 can be implemented across multiple locations, such as a local data center 102 and a remote data center 104. For example, the distributed storage system 122 can include a cluster of storage nodes distributed among the two data centers 102, 104. The distributed storage system 122 can include multiple storage layers. In this example, the distributed storage system 122 includes two storage layers: an upper storage layer 106 and a lower storage layer 108.

The lower storage layer 108 can be an existing legacy storage system and can include multiple storage nodes at different storage sites. For example, the lower storage layer 108 of the distributed storage system 122 can include multiple local storage nodes similar to the local storage node 114 at the local data center 102; and multiple remote storage nodes similar to the remote storage node 116 at the remote data center 104. The lower storage layer 108 can be a block storage layer where the storage data 130 is stored as blocks in the block storage layer. Each block has a unique identifier for allowing it to be placed wherever is most convenient in the distributed storage system 122. Alternatively, the lower storage layer 108 can be a file storage layer where the storage data 130 is stored as files. The one or more files are organized in a hierarchical structure and represented as a hierarchy of files in folders. Each file can be found via a unique path within the file storage layer. The storage nodes in the lower storage layer 108 can communicate with one another via a second network 120. In some examples, the second network 120 is an internal array network at the lower storage layer 108, such as SAN, with high speed and reliability. As used herein, a "storage node" can refer to a physical server or a virtual machine with access to one or more physical storage mediums, such as hard-disk drives (HDDs) and solid-state drives (SDDs).

The upper storage layer 106 is built on top of the lower storage layer 108 to provide a gateway interface to assist clients (e.g., client applications) with accessing underlying storage data in the lower storage layer 108. In some examples, the upper storage layer 106 is an object storage layer storing data objects 126 corresponding to the underlying storage data 130. For instance, the upper storage layer 106 can include a Ceph storage system. The Ceph storage system can include one or more object storage daemons (OSDs) for storing primary data, provided by a user, in data objects 126. Each data object includes primary data, metadata, and a unique identifier that applications can use for data access and retrieval. As used herein, a "data object" or "object" can refer to a discrete unit of unstructured data managed by an object storage system (as opposed to a file in file storage, or a block in block storage).

The upper storage layer 106 is configured as an interface between a client device 124 and the lower storage layer 108. The upper storage layer 106 can include gateways, such as the local gateway 110 and remote gateway 112. Each gateway in the upper storage layer 106 can include one or more nodes, such as a cluster of nodes. In some examples, the one or more nodes are configured for software-defined storage. The gateways 110, 112 can receive read and write requests from the client device 124 and responsively interact with the lower storage layer 108 to fulfill the requests. The gateways can also communicate with the storage nodes, such as the local storage node 114 and the remote storage node 116, at the lower storage layer 108. For example, a local gateway 110 can send a command 132 to a local storage node 114 for certain operations, such as read or write. In the context of Ceph, a gateway can be an object storage gateway such as the RADOS Gateway (RGW), which includes an object storage interface built on top of the librados library to provide applications with a RESTful gateway to the storage nodes at the lower storage layer 108.

The gateways 110, 112 can each store metadata at the upper storage layer 106 about the storage data on their associated storage nodes at the lower storage layer 108. For example, the local gateway 110 can store metadata 128 at the upper storage layer 106, where the metadata 128 is related to the storage data 130 at the lower storage layer 108. In some examples, the metadata 128 can include a mapping between the data objects 126 at the upper storage layer 106 to logical addresses of the underlying storage data 130 at the lower storage layer 108. The local addresses can indicate locations at the lower storage layer 108 where the storage data 130 corresponding to the data objects 126 at the upper storage layer 106 is located. The distributed storage system 122 can use the metadata 128 to rapidly determine which underlying storage data at the lower storage layer 108 correspond to which data objects stored at the upper storage layer 106, which may be useful for various reading and writing operations. The gateways 110, 112 can communicate with one another over a first network 118. The first network 118 can be an internet protocol (IP) network, such as the Internet.

In some examples, the distributed storage system 122 detects an event that triggers a replication process. The triggering event can be that the local gateway 110 detects that one or more of the data objects 126 are not stored in the remote data center 104 after communicating with the remote gateway 112 in the remote data center 104. As another example, the triggering event can be that the local gateway 110 receives a replication request from a client device 124 for replicating one or more of the data objects 126. As yet another example, the triggering event can be that one or more of the data objects 126 were recently uploaded or updated in the local data center 102 by a client device 124. The replication process can be for replicating one or more sets of the storage data 130 corresponding to the one or more of the data objects 126 from the local data center 102 to the remote data center 104.

Based on detecting the triggering event, the local gateway 110 can initiate the replication process. The local gateway 110 can access metadata 128 to determine the one or more sets of the storage data 130 corresponding to the one or more of the data objects 126 indicated in the triggering event. A mapping of the data objects 126 at the upper storage layer 106 to logical addresses associated with the lower storage layer 108 can be used to identify the logical addresses of the corresponding one or more sets of the storage data 130. The logical addresses are where the one or more sets of the storage data 130 are located at the lower storage layer 108.

The local gateway 110 then transmits the metadata 128 associated with the one or more sets of the storage data 130 to the remote gateway 112 via a first network 118. In some examples, the local gateway 110 can request to write to the remote gateway 112, receive an approval from the remote gateway 112, and then write the metadata 128 to the remote gateway 112 (e.g., via direct memory access technologies). Alternatively, the remote gateway 112 can receive the metadata 128 from the local gateway 110 and write it in the memory itself.

The local gateway 110 can also transmit a command 132 to the local storage node 114 in the local data center 102 where the one or more sets of the storage data 130 are located. The command 132 causes the local storage node 114 to transmit the one or more sets of the storage data 130 to the remote storage node 116 in the remote data center 104 via a second network 120. The remote storage node 116 can be selected by the distributed storage system 122 for storing the one or more sets of the storage data 130 based on storage space availability. The remote storage node 116 can additionally or alternatively be selected for storing the one or more sets of the storage data 130 based on one or more other factors, such as one or more policies, algorithms, or service level agreements. In some examples, the local storage node 114 can request to write to the remote storage node 116, receive an approval from the remote storage node 116, and then write the one or more sets of the storage data 130 to the remote storage node 116 (e.g., via direct memory access technologies). Alternatively, the remote storage node 116 can receive the one or more sets of the storage data 130 from the local storage node 114 and write them in storage itself.

Although shown as separate networks in FIG. 1, in other examples the first network 118 and the second network 120 can be the same network. The metadata 128 can still transmitted from the local gateway 110 to the remote gateway 112 at the upper storage layer 106, and the storage data 130 can still be transmitted from the local storage node 114 to the remote storage node 116 at the lower storage layer 108.

In some examples, the local gateway 110 can transmit the metadata 128 to a storage node, such as the local storage node 114, at the lower storage layer 108 in the local data center 102. The storage node can receive the metadata 128 and transmit the metadata 128 via the second network 120 to another storage node, such as the remote storage node 116, at the lower storage layer 108 in the remote data center 104. The other storage node can then transmit the metadata 128 to the remote gateway 112 at the upper storage layer 106. Using the second network 120 and the lower storage layer 108 for transmitting metadata 128 can be fast and reliable, especially when the first network 118 becomes crowded and unreliable.

Figure 2:
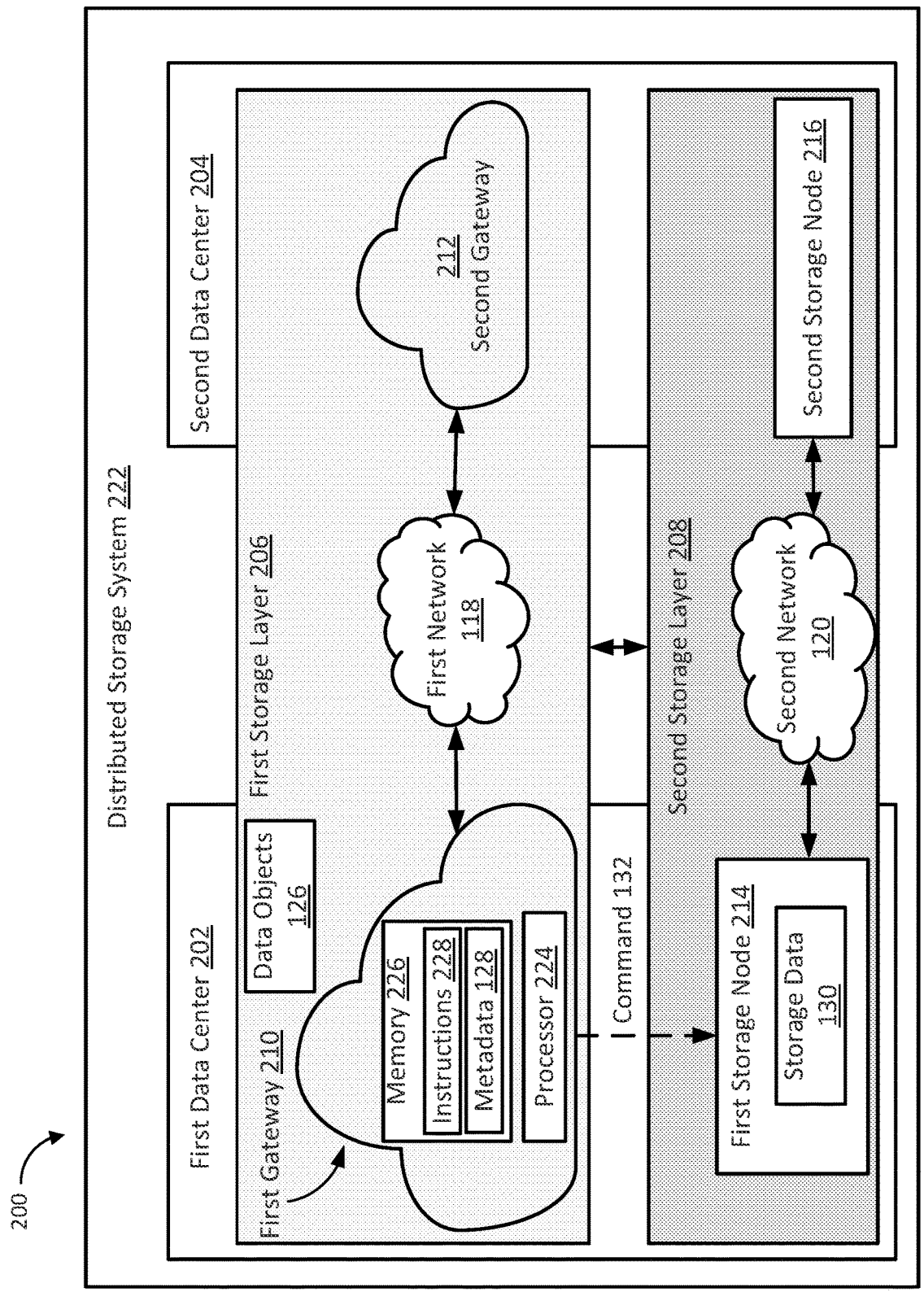
FIG. 2 is a block diagram of another example of a system for replicating storage data and metadata in separate storage layers of a distributed storage system according to some aspects.

FIG. 2 is a block diagram of another example of a system 200 for replicating storage data and metadata in separate storage layers of distributed storage system 222 according to some aspects. The distribution storage system 222 has a first storage layer 206 and a second storage layer 208 implemented in both the first data center 202 and the second data center 204. The first storage layer 206 can be similar to the upper storage layer 106 in FIG. 1 and the second storage layer 208 can be similar to the lower storage layer 108 in FIG. 1. The first data center 202 can be similar to the local data center 102 in FIG. 1 and the second data center 204 can be similar to the remote data center 104 in FIG. 1.

The first storage layer 206 includes a first gateway 210 associated with a first storage node 214 at the second storage layer 208 in the first data center 202. The first gateway 210 can be similar to the local gateway 110 in FIG. 1 and the first storage node 214 can be similar to the local storage node 114 in FIG. 1. The first storage layer 206 also includes a second gateway 212 associated with a second storage node 216 at the second storage layer 208 in the second data center 204. The second gateway 212 can be similar to the remote gateway 112 and the second storage node 216 can be similar to the remote storage node 116 in FIG. 1. The first gateway 210 and the second gateway 212 can communicate via a first network 118. The first storage node 214 and the second storage node 216 can communicate via a second network 120.

The first gateway 210 can include one or more nodes, such as physical or virtual machines. In some examples, the first gateway 210 includes a processor 224 and a memory 226. The processor 224 is communicatively coupled with the memory 226. The processor 224 can include one processing device or multiple processing devices. Non-limiting examples of the processor 224 include a Field-Programmable Gate Array (FPGA), an application-specific integrated circuit (ASIC), or a microprocessor. The processor 224 can execute instructions 228 stored in the memory 226 to perform operations. In some examples, the instructions 228 can include processor-specific instructions generated by a compiler or an interpreter from code written in any suitable computer-programming language, such as C, C++, C#, etc.

The memory 226 can include one memory device or multiple memory devices. The memory 226 can be non-volatile and may include any type of memory device that retains stored information, such as metadata 128 and instructions 228, when powered off. Non-limiting examples of the memory 226 include electrically erasable and programmable read-only memory (EEPROM), flash memory, or any other type of non-volatile memory. At least some of the memory device includes a non-transitory computer-readable medium from which the processor 224 can read the instructions 228. A computer-readable medium can include electronic, optical, magnetic, or other storage devices capable of providing the processor 224 with computer-readable instructions or other program code. Non-limiting examples of a computer-readable medium include magnetic disk(s), memory chip(s), read-only memory (ROM), random-access memory (RAM), an ASIC, a configured processor, optical storage, or any other medium from which a computer processor can read the instructions 228.

In some examples, the processor 224 of the first gateway 210 can determine that a data object 126 is to be replicated to a second data center 204, which is remote from a first data center 202 housing the first gateway 210. In response to determining that the data object 126 is to be replicated to the second data center 204, the processor 224 of the first gateway 210 can access metadata 128 stored in memory 226 to determine that the data object 126 corresponds to a set of storage data 130 stored on a first storage node 214 in the first data center 202. The processor 224 of the first gateway 210 can transmit the metadata 128 associated with the set of storage data 130 to a second gateway 212 in the second data center 204 via a first network 118. The processor 224 of the first gateway 210 can also transmit a command 132 to the first storage node 214 in the first data center 202. The command 132 can be configured to cause the first storage node 214 to transmit the set of storage data 130 to a second storage node 216 in the second data center 204 via a second network 120, which may or may not be different from the first network 118.

Although not shown in FIG. 2 to avoid clutter, the other nodes may also have respective processors, memories, and instructions that allow them to perform their functionality described herein.

Figure 3:
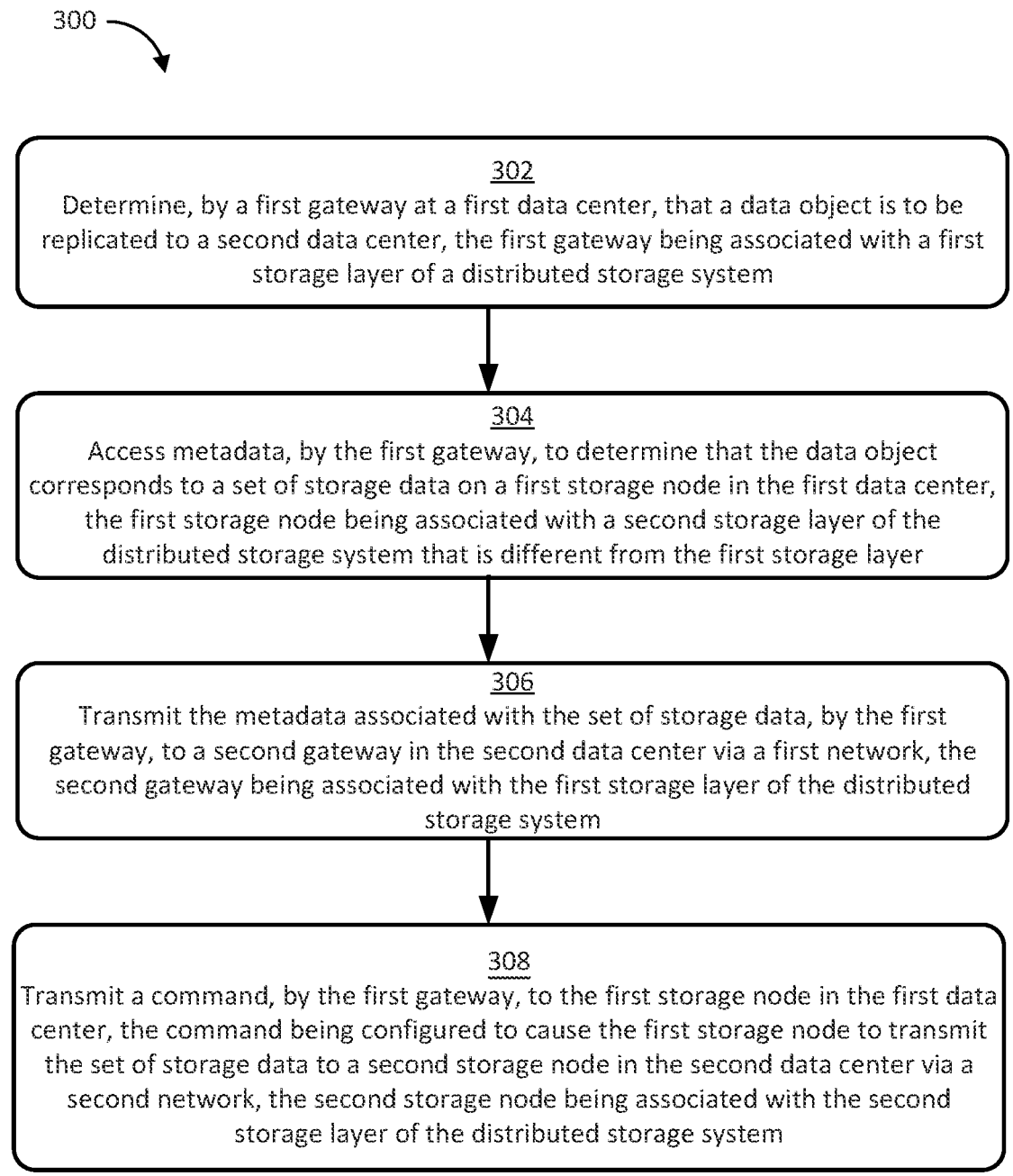
FIG. 3 is a flow chart of an example of a process for replicating storage data and metadata in separate storage layers of a distributed storage system according to some aspects.

In some examples, the first gateway 210 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIG. 2.

At block 302, a first gateway 210 in a first data center 202 determines that a data object 126 is to be replicated to a second data center 204. The first gateway 210 is associated with a first storage layer 206 of a distributed storage system 222. The first gateway 210 can determine that the data object 126 is to be replicated to a second data center 204 in response to detecting one or more events, such as detecting that the data object 126 is not stored in the second data center 204 after communicating with the second gateway 212 in the second data center 204. Alternatively, the first gateway 210 can determine that the data object 126 is to be replicated to a second data center 204 in response to receiving a replication request from a client device 124. Also alternatively, the first gateway 210 can determine that the data object 126 is to be replicated to a second data center 204 in response to determining that the data object 126 was recently uploaded or updated (e.g., just uploaded for the first time) in the first data center 202 by a client device 124, and thus replication is needed.

At block 304, the first gateway 210 accesses metadata 128 to determine that the data object 126 corresponds to a set of storage data 130 stored on a first storage node 214 in the first data center 202. The metadata 128 can indicate the relationship between the data object 126 at the first storage layer 206 and the actual underlying set of storage data 130 at the second storage layer 208. The first storage node 214 is associated with a second storage layer 208, which is different from the first storage layer 206. The metadata 128 can include a mapping of the data object 126 at the first storage layer 206 to one or more logical addresses associated with the set of storage data 130 at the second storage layer 208. The logical addresses indicate locations at the second storage layer where the set of storage data 130 corresponding to the data object 126 is located.

At block 306, the first gateway 210 transmits the metadata 128 associated with the set of storage data 130 to a second gateway 212 in the second data center 204 via a first network 118. The second gateway 212 is associated with the first storage layer 206 of the distributed storage system 222. In some examples, the first gateway 210 can request to write to the second gateway 212, receive an approval message from the second gateway 212, and then directly write the metadata 128 to the second gateway 212 (e.g., through direct memory access technologies). In some examples, the first gateway 210 can transmit the metadata 128 to the second gateway 212, which can receive the metadata 128 and write it in the memory itself.

At block 308, the first gateway 210 transmits a command 132 to the first storage node 214 in the first data center 202. The command 132 can be configured to cause the first storage node 214 to transmit the set of storage data 130 to a second storage node 216 in the second data center 204 via a second network 120, which may be the same as or different from the first network 118. The second storage node 216 is associated with the second storage layer 208 of the distributed storage system 222. The second storage node 216 can be selected randomly or based on storage space availability. The second storage node 216 can also be selected based on a service level agreement between the distributed storage system and the second data center. In some examples, the first storage node 214 can request to write to the second storage node 216, receive an approval message from the second storage node 216, and then directly write the set of storage data 130 to the second storage node 216 (e.g., through direct memory access technologies). In other examples, the first storage node 214 can transmit the set of storage data 130 to the second storage node 216, which can receive the set of storage data and write it in the storage itself.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A non-transitory computer-readable medium comprising program code that is executable by a processor of a first gateway of a first storage layer of a distributed storage system, the program code being executable for causing the first gateway to:
   determine that a data object is to be replicated from a first data center to a second data center, the second data center being remote from the first data center, wherein the first data center includes the first gateway; and
   in response to determining that the data object is to be replicated to the second data center:
      access metadata to determine that the data object corresponds to a set of storage data on a first storage node in the first data center, the first storage node being in a second storage layer of the distributed storage system that is different from the first storage layer;
      transmit the metadata via a first network to a second gateway of the first storage layer, the second gateway being in the second data center; and
      transmit a command to the first storage node in the first data center, the command being configured to cause the first storage node to transmit the set of storage data to a second storage node in the second data center via a second network, the second storage node being in the second storage layer of the distributed storage system.

2. The non-transitory computer-readable medium of claim 1, wherein the first storage layer is an object storage layer.

3. The non-transitory computer-readable medium of claim 1, wherein the second storage layer is a block storage layer, and wherein the set of storage data is one or more blocks at the block storage layer.

4. The non-transitory computer-readable medium of claim 1, wherein the second storage layer is a file storage layer, and wherein the set of storage data is one or more files at the file storage layer.

5. The non-transitory computer-readable medium of claim 1, wherein the first network is different from the second network.

6. The non-transitory computer-readable medium of claim 1, wherein the first storage layer is configured as an interface between client devices and the second storage layer, wherein the first gateway and the second gateway are configured to receive read and write requests from the client devices and responsively interact with the second storage layer to fulfill the requests.

7. The non-transitory computer-readable medium of claim 1, wherein the metadata includes a mapping of data objects at the first storage layer to logical addresses associated with the second storage layer, the logical addresses indicating locations at the second storage layer where the storage data corresponding to the data objects is located.

8. A method comprising:
determining, by a first gateway of a first storage layer of a distributed storage system, that a data object is to be replicated from a first data center to a second data center that is remote from the first data center, wherein the first data center includes the first gateway; and
in response to determining that the data object is to be replicated to the second data center:
accessing, by the first gateway, metadata to determine that the data object corresponds to a set of storage data on a first storage node in the first data center, the first storage node being in a second storage layer of the distributed storage system that is different from the first storage layer;
transmitting, by the first gateway, the metadata via a first network to a second gateway of the first storage layer, the second gateway being in the second data center; and
transmitting, by the first gateway, a command to the first storage node in the first data center, the command being configured to cause the first storage node to transmit the set of storage data to a second storage node in the second data center via a second network, the second storage node being in the second storage layer of the distributed storage system.

9. The method of claim 8, wherein the first storage layer is an object storage layer.

10. The method of claim 8, wherein the second storage layer is a block storage layer, and wherein the set of storage data is stored as one or more blocks at the block storage layer.

11. The method of claim 8, wherein the second storage layer is a file storage layer, and wherein the set of storage data is stored as one or more files at the file storage layer.

12. The method of claim 8, wherein the first network is different from the second network.

13. The method of claim 8, wherein the first storage layer is configured as an interface between client devices and the second storage layer, wherein the first gateway and the second gateway are configured to receive read and write requests from the client devices and responsively interact with the second storage layer to fulfill the requests.

14. The method of claim 8, wherein the metadata includes a mapping of data objects at the first storage layer to logical addresses associated with the second storage layer, the logical addresses indicating locations at the second storage layer where the storage data corresponding to the data objects is located.

15. A system comprising:
a processor of a first gateway of a first storage layer of a distributed storage system; and
a memory including instructions that are executable by the processor for causing the first gateway to:
determine that a data object is to be replicated from a first data center to a second data center that is remote from the first data center, wherein the first data center includes the first gateway; and
in response to determining that the data object is to be replicated to the second data center:
access metadata to determine that the data object corresponds to a set of storage data stored on a first storage node in the first data center, the first storage node being in a second storage layer of the distributed storage system that is different from the first storage layer;
transmit the metadata via a first network to a second gateway of the first storage layer, the second gateway being in the second data center; and
transmit a command to the first storage node in the first data center, the command being configured to cause the first storage node to transmit the set of storage data to a second storage node in the second data center via a second network, the second storage node being in the second storage layer of the distributed storage system.

16. The system of claim 15, wherein the first storage layer is an object storage layer, wherein the first storage layer is configured as an interface between client devices and the second storage layer, wherein the first gateway and the second gateway are configured to receive read and write requests from the client devices and responsively interact with the second storage layer to fulfill the requests.

17. The system of claim 15, wherein the second storage layer is a block storage layer, and wherein the set of storage data is one or more blocks at the block storage layer.

18. The system of claim 15, wherein the second storage layer is a file storage layer, and wherein the set of storage data is one or more files at the file storage layer.

19. The system of claim 15, wherein the first network is the Internet and the second network is a storage area network that is different from the Internet.

20. The system of claim 15, wherein the metadata includes a mapping of data objects at the first storage layer to logical addresses associated with the second storage layer, the logical addresses indicating locations at the second storage layer where the storage data corresponding to the data objects is located.

* * * * *